US008745123B2

(12) United States Patent
Blocksome et al.

(10) Patent No.: US 8,745,123 B2
(45) Date of Patent: *Jun. 3, 2014

(54) COMPLETION PROCESSING FOR DATA COMMUNICATIONS INSTRUCTIONS

(71) Applicant: International Business Machines Corporation, Armonk, NY (US)

(72) Inventors: Michael A. Blocksome, Rochester, MN (US); Sameer Kumar, White Plains, NY (US); Jeffrey J. Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,168

(22) Filed: Nov. 30, 2012

(65) Prior Publication Data

US 2013/0110901 A1    May 2, 2013

Related U.S. Application Data

(63) Continuation of application No. 12/985,611, filed on Jan. 6, 2011.

(51) Int. Cl.
*G06F 15/16*    (2006.01)
(52) U.S. Cl.
USPC .......................................... 709/201; 712/200
(58) Field of Classification Search
USPC ........................... 709/201, 732–735; 712/200
See application file for complete search history.

(56) References Cited

U.S. PATENT DOCUMENTS

| 4,893,303 | A | 1/1990 | Naramura |
| 5,488,608 | A | 1/1996 | Flammer, III |
| 5,802,278 | A | * | 9/1998 | Isfeld et al. ................... 709/249 |
| 6,337,852 | B1 | 1/2002 | Desnoyers et al. |
| 6,438,748 | B1 | 8/2002 | Gard et al. |
| 6,519,310 | B2 | 2/2003 | Chapple |
| 6,553,002 | B1 | 4/2003 | Bremer et al. |
| 6,553,031 | B1 | 4/2003 | Nakamura et al. |
| 6,591,310 | B1 | 7/2003 | Johnson |
| 6,601,089 | B1 | 7/2003 | Sistare et al. |
| 6,801,927 | B1 | 10/2004 | Smith et al. |

(Continued)

OTHER PUBLICATIONS

Robinson et al., "A Task Migration Implementation of the Message-Passing Interference", May 1996, IEEE, HPDC 5'96,pp. 61-68.

(Continued)

*Primary Examiner* — Ario Etienne
*Assistant Examiner* — Kidest Mendaye
(74) *Attorney, Agent, or Firm* — Biggers Kennedy Lenart Spraggins LLP (57) ABSTRACT

Completion processing of data communications instructions in a distributed computing environment, including receiving, in an active messaging interface ('AMI') data communications instructions, at least one instruction specifying a callback function; injecting into an injection FIFO buffer of a data communication adapter, an injection descriptor, each slot in the injection FIFO buffer having a corresponding slot in a pending callback list; listing in the pending callback list any callback function specified by an instruction, incrementing a pending callback counter for each listed callback function; transferring payload data as per each injection descriptor, incrementing a transfer counter upon completion of each transfer; determining from counter values whether the pending callback list presently includes callback functions whose data transfers have been completed; calling by the AMI any such callback functions from the pending callback list, decrementing the pending callback counter for each callback function called.

8 Claims, 4 Drawing Sheets

(56) References Cited

U.S. PATENT DOCUMENTS

| | | | |
|---|---|---|---|
| 6,847,911 B2 * | 1/2005 | Huckaby et al. | 702/130 |
| 6,847,991 B1 | 1/2005 | Kurapati | |
| 6,993,769 B2 | 1/2006 | Simonson et al. | |
| 7,155,560 B2 | 12/2006 | McGrew et al. | |
| 7,237,036 B2 * | 6/2007 | Boucher et al. | 709/245 |
| 7,328,300 B2 | 2/2008 | Bennett | |
| 7,392,352 B2 | 6/2008 | Mithal et al. | |
| 7,418,470 B2 | 8/2008 | Howard et al. | |
| 7,464,138 B2 | 12/2008 | Le et al. | |
| 7,533,197 B2 | 5/2009 | Leonard et al. | |
| 7,552,312 B2 | 6/2009 | Archer et al. | |
| 7,673,011 B2 | 3/2010 | Archer et al. | |
| 7,991,978 B2 | 8/2011 | Kuesel et al. | |
| 8,001,280 B2 | 8/2011 | Blumrich et al. | |
| 8,018,951 B2 | 9/2011 | Blocksome | |
| 8,041,969 B2 | 10/2011 | Archer et al. | |
| 8,250,164 B2 * | 8/2012 | Archer et al. | 709/208 |
| 8,286,188 B1 | 10/2012 | Brief | |
| 2002/0054051 A1 | 5/2002 | Ladd | |
| 2003/0093485 A1 | 5/2003 | Dougall et al. | |
| 2003/0195991 A1 | 10/2003 | Masel et al. | |
| 2005/0166209 A1 | 7/2005 | Merrick et al. | |
| 2005/0289235 A1 | 12/2005 | Suematsu et al. | |
| 2006/0059257 A1 | 3/2006 | Collard et al. | |
| 2006/0101104 A1 | 5/2006 | Bhanot et al. | |
| 2006/0227774 A1 | 10/2006 | Hoenicke | |
| 2007/0078997 A1 | 4/2007 | Stern | |
| 2007/0124453 A1 | 5/2007 | Slaughter et al. | |
| 2007/0169179 A1 | 7/2007 | Narad | |
| 2008/0101295 A1 | 5/2008 | Tomita et al. | |
| 2008/0281998 A1 * | 11/2008 | Archer et al. | 710/22 |
| 2009/0003344 A1 | 1/2009 | Kumar | |
| 2009/0006808 A1 * | 1/2009 | Blumrich et al. | 712/12 |
| 2009/0006810 A1 | 1/2009 | Almasi et al. | |
| 2009/0007141 A1 * | 1/2009 | Blocksome et al. | 719/315 |
| 2009/0022156 A1 * | 1/2009 | Blocksome | 370/394 |
| 2009/0037377 A1 | 2/2009 | Archer et al. | |
| 2009/0089670 A1 | 4/2009 | Gooding et al. | |
| 2009/0129277 A1 | 5/2009 | Supalov et al. | |
| 2009/0138892 A1 | 5/2009 | Almasi et al. | |
| 2009/0254920 A1 | 10/2009 | Truschin et al. | |
| 2010/0005189 A1 | 1/2010 | Archer et al. | |
| 2010/0058356 A1 | 3/2010 | Aho et al. | |
| 2010/0232448 A1 | 9/2010 | Sugumar et al. | |
| 2011/0314255 A1 | 12/2011 | Krishna et al. | |
| 2012/0079035 A1 | 3/2012 | Archer et al. | |
| 2012/0079133 A1 | 3/2012 | Archer et al. | |
| 2012/0117137 A1 | 5/2012 | Blocksome et al. | |
| 2012/0117138 A1 | 5/2012 | Blocksome et al. | |
| 2012/0117211 A1 | 5/2012 | Blocksome et al. | |
| 2012/0117281 A1 | 5/2012 | Blocksome et al. | |
| 2012/0137294 A1 | 5/2012 | Archer et al. | |
| 2012/0144400 A1 | 6/2012 | Davis et al. | |
| 2012/0144401 A1 | 6/2012 | Faraj | |
| 2012/0151485 A1 | 6/2012 | Archer et al. | |
| 2012/0179736 A1 | 7/2012 | Blocksome et al. | |
| 2012/0179760 A1 | 7/2012 | Blocksome et al. | |
| 2012/0185679 A1 | 7/2012 | Archer et al. | |
| 2012/0185873 A1 | 7/2012 | Archer et al. | |
| 2012/0210094 A1 | 8/2012 | Blocksome et al. | |
| 2012/0254344 A1 | 10/2012 | Archer et al. | |
| 2013/0061244 A1 | 3/2013 | Davis et al. | |
| 2013/0061245 A1 | 3/2013 | Faraj | |
| 2013/0067111 A1 | 3/2013 | Archer et al. | |
| 2013/0067206 A1 | 3/2013 | Archer et al. | |
| 2013/0073751 A1 | 3/2013 | Blocksome et al. | |
| 2013/0074097 A1 | 3/2013 | Archer et al. | |
| 2013/0081059 A1 | 3/2013 | Archer et al. | |
| 2013/0091510 A1 | 4/2013 | Archer et al. | |
| 2013/0097263 A1 | 4/2013 | Blocksome et al. | |
| 2013/0097404 A1 | 4/2013 | Blocksome et al. | |
| 2013/0097614 A1 | 4/2013 | Blocksome et al. | |
| 2013/0110901 A1 | 5/2013 | Blocksome et al. | |
| 2013/0117403 A1 | 5/2013 | Archer et al. | |
| 2013/0117761 A1 | 5/2013 | Archer et al. | |
| 2013/0117764 A1 | 5/2013 | Archer et al. | |
| 2013/0124666 A1 | 5/2013 | Archer et al. | |
| 2013/0125135 A1 | 5/2013 | Archer et al. | |
| 2013/0125140 A1 | 5/2013 | Archer et al. | |
| 2013/0174180 A1 | 7/2013 | Blocksome et al. | |
| 2013/0185465 A1 | 7/2013 | Blocksome | |

OTHER PUBLICATIONS

Office Action, U.S. Appl. No. 12/959,539, Oct. 26, 2012.
Office Action, U.S. Appl. No. 12/892,192, Oct. 30, 2012.
Final Office Action, U.S. Appl. No. 12/892,153, Sep. 25, 2012.
Office Action, U.S. Appl. No. 12/940,300, Sep. 19, 2012.
Office Action, U.S. Appl. No. 12/963,694, Dec. 24, 2012.
Office Action, U.S. Appl. No. 13/290,670, Dec. 17, 2012.
Office Action, U.S. Appl. No. 13/290,642, Jan. 7, 2013.
U.S. Appl. No. 12/985,651, filed Jan. 6, 2011.
U.S. Appl. No. 13/290,670, filed Nov. 7, 2011.
U.S. Appl. No. 13/290,642, filed Nov. 7, 2011.
U.S. Appl. No. 13/292,293, filed Nov. 9, 2011.
U.S. Appl. No. 13/659,370, filed Oct. 24, 2012.
U.S. Appl. No. 13/659,458, filed Oct. 24, 2012.
U.S. Appl. No. 13/668,503, filed Nov. 5, 2012.
U.S. Appl. No. 13/671,762, filed Nov. 8, 2012.
U.S. Appl. No. 13/673,188, filed Nov. 9, 2012.
U.S. Appl. No. 13/677,993, filed Nov. 15, 2012.
U.S. Appl. No. 13/678,799, filed Nov. 16, 2012.
U.S. Appl. No. 13/677,507, filed Nov. 15, 2012.
U.S. Appl. No. 13/679,042, filed Nov. 16, 2012.
U.S. Appl. No. 13/690,168, filed Nov. 30, 2012.
U.S. Appl. No. 13/681,903, filed Nov. 20, 2012.
U.S. Appl. No. 13/680,772, filed Nov. 19, 2012.
Foster et al., Managing Multiple Communication Method in High-Performance Networked Computing Systems. http://www.mcs.anl.gov/nexus, 1997, pp. 1-25.
Robinson et al., "A Task Migration Implementation of the Message-Passing Interface", May 1996, IEEE, HPDC-5'96, pp. 61-68.
A Message Passing Interface for Parallel and Distributed Computing, Hairi et al., 1993, pp. 1-8.
Introduction to Parallel Computing and the Message Passing Interface (MPI), Kuiper, 2008, pp. 1-39.
Parallel net DCF A High-Performance Scientific I/O Interface, Li et al., 2003, pp. 1-11.
HPSS MPI-IO: A Standard Parallel Interface to HPSS File System, Loewe, 2001, pp. 1-19.
Notice of Allowance, U.S. Appl. No. 12/959,455, Mar. 1, 2013.
Notice of Allowance, U.S. Appl. No. 12/959,539, filed Mar. 6, 2013.
Office Action, U.S. Appl. No. 13/007,860, Mar. 19, 2013.
Office Action, U.S. Appl. No. 12/963,671, Mar. 1, 2013.
Office Action, U.S. Appl. No. 12/940,198, Feb. 14, 2013.
Office Action, U.S. Appl. No. 12/940,282, Feb. 5, 2013.
Office Action, U.S. Appl. No. 13/668,503, Feb. 13, 2013.
Office Action, U.S. Appl. No. 13/673,188, Mar. 5, 2013.
Office Action, U.S. Appl. No. 13/678,799, Feb. 5, 2013.
Office Action, U.S. Appl. No. 13/681,903, Apr. 2, 2013.
Office Action, U.S. Appl. No. 13/709,305, Mar. 25, 2013.
Office Action, U.S. Appl. No. 13/711,108, Mar. 22, 2013.
Knudson, Brant; "IBM System Blue Gene Solution: Blue Gene/P Application Development," *IBM Redbooks*, pp. 1-406, Sep. 2009.
Blocksome, Michael; "Optimizing MPI Collectives using Efficient Intra-node Communication Techniques over the BlueGene/P Supercomputer," *Computer Science IBM Research Report*, Dec. 2010.
Kumar et al., "The Deep Computing Messaging Framework: Generalized Scalable Message Passing Blue Gene/P Supercomputer", Proceedings of the 22nd Annual International Conference on Supercomputing (ICS '08), Jun. 2008, pp. 94-103, ACM New York, USA.
Banikazemi et al., "MPI-LAPI: An Efficient Implementation of MPI for IBM RS/6000 SP Systems", IEEE Transactions on Parallel and Distributed Systems, Oct. 2001, vol. 12, Issue 10, pp. 1081-1093, IEEE Xplore Digital Library (online publication), IEEE.org, USA, DOI: 10.1109/71.963419.

(56) References Cited

OTHER PUBLICATIONS

Myricom, "Myrinet Express (MX): A High-Performance, Low-Level, Message-Passing Interface for Myrinet", Myricom.com (online publication), Version 1.2, Oct. 2006, pp. 1-65, Myricom Inc., USA.
Dinan et al., "Hybrid Parallel Programming With MPI and Unified Parallel C", Proceedings of the 7th ACM International Conference on Computing Frontiers (CF'10), May 2010, pp. 177-186, ACM New York, USA.
Dozsa et al., "Enabling Concurrent Multithreaded MPI Communication on Multicore Petascale Systems", Proceedings of the 17th European MPI Users' Group Meeting Conference on Recent Advances in the Message Passing Interface (EuroMPI'10), Apr. 2010, pp. 11-20 (reprinted pp. 1-9), Springer-Verlag Berlin, Heidelberg.
Foster et al., "Managing Multiple Communication Methods in High-Performance Networked Computing Systems", Journal of Parallel and Distributed Computing, vol. 40, Issue 1, Jan. 1997, pp. 1-25, (online publication), ScienceDirect.com, USA.
Robinson et al., "A Task Migration Implementation of the Message-Passing Interface", Proceedings of the 5th IEEE International Symposium on High Performance Distributed Computing (HPDC'96), May 1996, pp. 61-68, IEEE Computer Society, Washington DC, USA.
Final Office Action, U.S. Appl. No. 12/892,192, May 2, 2013.
Office Action, U.S. Appl. No. 12/892,192, Sep. 30, 2013.
Notice of Allowance, U.S. Appl. No. 13/007,860, Jul. 3, 2013.
Office Action, U.S. Appl. No. 12/892,153, Apr. 25, 2013.
Final Office Action, U.S. Appl. No. 12/892,153, Aug. 14, 2013.
Office Action, U.S. Appl. No. 13/007,848, May 15, 2013.
Final Office Action, U.S. Appl. No. 13/007,848, Sep. 13, 2013.
Notice of Allowance, U.S. Appl. No. 12/963,671, Sep. 18, 2013.
Final Office Action, U.S. Appl. No. 12/940,198, Aug. 14, 2013.
Final Office Action, U.S. Appl. No. 12/940,259, Aug. 14, 2013.
Final Office Action, U.S. Appl. No. 12/940,282, Sep. 10, 2013.
Notice of Allowance, U.S. Appl. No. 12/940,300, Apr. 29, 2013.
Notice of Allowance, U.S. Appl. No. 12/963,694, Jun. 18, 2013.
Office Action, U.S. Appl. No. 12/985,651, Aug. 5, 2013.
Notice of Allowance, U.S. Appl. No. 13/290,670, Mar. 27, 2013.
Notice of Allowance, U.S. Appl. No. 13/290,642, May 1, 2013.
Office Action, U.S. Appl. No. 13/292,293, Jul. 19, 2013.
Office Action, U.S. Appl. No. 13/659,370, Oct. 21, 2013.
Final Office Action, U.S. Appl. No. 13/668,503, Jul. 11, 2013.
Office Action, U.S. Appl. No. 13/671,762, May 13, 2013.
Final Office Action, U.S. Appl. No. 13/671,762, Sep. 13, 2013.
Office Action, U.S. Appl. No. 13/673,188, Jul. 25, 2013.
Final Office Action, U.S. Appl. No. 13/678,799, Aug. 30, 2013.
Final Office Action, U.S. Appl. No. 13/677,507, Aug. 22, 2013.
Office Action, U.S. Appl. No. 13/676,700, Jun. 5, 2013.
Office Action, U.S. Appl. No. 13/690,168, Aug. 15, 2013.
Notice of Allowance, U.S. Appl. No. 13/681,903, Sep. 30, 2013.
Office Action, U.S. Appl. No. 13/680,772, Aug. 15, 2013.
Office Action, U.S. Appl. No. 13/710,066, Jul. 19, 2013.
Notice of Allowance, U.S. Appl. No. 13/709,305, Aug. 27, 2013.
Final Office Action, U.S. Appl. No. 13/711,108, Jul. 5, 2013.
Notice of Allowance, U.S. Appl. No. 13/711,108, Sep. 19, 2013.
Notice of Allowance, U.S. Appl. No. 13/784,198, Sep. 20, 2013.
Final Office Action, U.S. Appl. No. 12/956,903, Nov. 6, 2013.
Notice of Allowance, U.S. Appl. No. 13/292,293, Nov. 7, 2013.
Notice of Allowance, U.S. Appl. No. 12/985,611, Jan. 2, 2014.
Schiff et al., "Robust Message-Passing for Statistical Inference in Sensor Network", Sixth International Conference on Information Processing in Sensor Networks (IPSN'07), Apr. 2007, pp. 109-118, ACM New York, USA.
Office Action, U.S. Appl. No. 12/985,611, Aug. 2, 2013.

\* cited by examiner

COMPLETION PROCESSING FOR DATA COMMUNICATIONS INSTRUCTIONS

CROSS-REFERENCE TO RELATED APPLICATION

This application is a continuation application of and claims priority from U.S. patent application Ser. No. 12/985,611, filed on Jan. 6, 2011.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for completion processing for data communications instructions in a distributed computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Data communications is an area of computer technology that has experienced advances, and modes of data communications today effectively implement distributed computing environments. In the 1990s, a consortium that included Apollo Computer (later part of Hewlett-Packard), IBM, Digital Equipment Corporation, and others developed a software system that was named 'Distributed Computing Environment.' That software system is mentioned here for the sake of clarity to explain that the term 'distributed computing environment' as used in this specification does not refer that software product from the 1990s. As the term is used here, 'distributed computing environment' refers to any aggregation of computers or compute nodes coupled for data communications through a system-level messaging layer in their communications protocol stacks, where the system-level messaging layer provides 'active' messaging, messaging with callback functions. Implementations of such system-level messaging include messaging layers in client-server architectures, messaging layers in Symmetric Multi-Processing ('SMP') architectures with Non-Uniform Memory Access ('NUMA'), and messaging layers in parallel computers, including Beowulf clusters and even supercomputers with many compute node coupled for data communications through such system-level messaging. Common implementations of system-level messaging for parallel processing include the well known Message Passing Interface ('MPI') and the Parallel Virtual Machine ('PVM'). Both of these permit the programmer to divide a task among a group of networked computers, and collect the results of processing. Examples of MPI implementations include OpenMPI and MPICH. These and others represent examples of implementations of system-level messaging that can be improved for completion processing for data communications instructions in a distributed computing environment according to embodiments of the present invention.

Parallel computing is another area of computer technology that has experienced advances. Parallel computing is the simultaneous execution of the same application (split up and specially adapted) on multiple processors in order to obtain results faster. Parallel computing is based on the fact that the process of solving a problem often can be divided into smaller jobs, which may be carried out simultaneously with some coordination. Parallel computing expands the demands on middleware messaging beyond that of other architectures because parallel computing includes collective operations, operations that are defined only across multiple compute nodes in a parallel computer, operations that require, particularly in supercomputers, massive messaging at very high speeds. Examples of such collective operations include BROADCAST, SCATTER, GATHER, AND REDUCE operations.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

There is at this time a general trend in computer processor development to move from multi-core to many-core processors: from dual-, tri-, quad-, hexa-, octo-core chips to ones with tens or even hundreds of cores. In addition, multi-core chips mixed with simultaneous multithreading, memory-on-chip, and special-purpose heterogeneous cores promise further performance and efficiency gains, especially in processing multimedia, recognition and networking applications. This trend is impacting the supercomputing world as well, where large transistor count chips are more efficiently used by replicating cores, rather than building chips that are very fast but very inefficient in terms of power utilization.

At the same time, the network link speed and number of links into and out of a compute node are dramatically increasing. IBM's BlueGene/Q™ supercomputer, for example, will have a five-dimensional torus network, which implements ten bidirectional data communications links per compute node—and BlueGene/Q will support many thousands of compute nodes. To keep these links filled with data, DMA engines are employed, but increasingly, the HPC community is interested in latency. In traditional supercomputers with pared-down operating systems, there is little or no multi-tasking within compute nodes. When a data communications link is unavailable, a task typically blocks or 'spins' on a data transmission, in effect, idling a processor until a data transmission resource becomes available. In the trend for more powerful individual processors, such blocking or spinning has a bad effect on latency.

Of course if an application blocks or 'spins' on a data communications program, then the application is advised immediately when the transfer of data pursuant to the instruction is completed, because the application cease further processing until the instruction is completed. But that benefit comes at the cost of the block or the spin during a period of time when a high performance application really wants to be doing other things, not waiting on input/output. There is therefore a trend in the technology of large scale messaging toward attenuating this need to spin on a data communications resource waiting for completion of a data transfer. There is a trend toward supporting non-blocking data communications instructions that allow an application to fire-and-forget an instruction and check later with some infrastructure to confirm that the corresponding data transfer has actually been completed. The trend is to track data transfers with message sequence numbers stored temporarily in communications buffers in messaging infrastructure. If a message can be immediately completed, its sequence number can be flagged as completed, and the application can call down into the messaging infrastructure to figure out whether the message data has been sent. For messages that take more time, a completion descriptor can be created and marked later to advise the application when a transfer is completed. All these prior art methods of completion processing for data communications instructions, however, require significant data processing overheads, maintenance of additional data structures and data, additional system calls from the application to check on instruction completion.

SUMMARY OF THE INVENTION

Methods, apparatus, and computer program products for completion processing of data communications instructions in a distributed computing environment, the distributed computing environment including a plurality of computers coupled for data communications through communications adapters and an active messaging interface ('AMI'), including receiving, in the AMI from an application executing on a computer in the distributed computing environment, a sequence of data communications instructions, each instruction specifying a transfer of payload data among computers in the distributed computing environment, at least one of the instructions specifying a callback function; injecting, by the AMI for each data communications instruction into a slot in an injection FIFO buffer of a data communication adapter, an injection descriptor specifying to the communications adapter the transfer of payload data, the slot in the injection FIFO buffer having a corresponding slot in a pending callback list; listing, by the AMI in the corresponding slot in the pending callback list for each data communications instruction, any callback function specified by that instruction, incrementing a pending callback counter for each listed callback function; transferring payload data by the communications adapter in accordance with each injection descriptor in the injection FIFO buffer, incrementing a transfer counter upon completion of each transfer; determining from counter values whether the pending callback list presently includes callback functions for which transfers of payload data have been completed; and calling by the AMI any callback functions in the pending callback list for which transfers of pay- load data have been completed, decrementing the pending callback counter for each callback function called.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
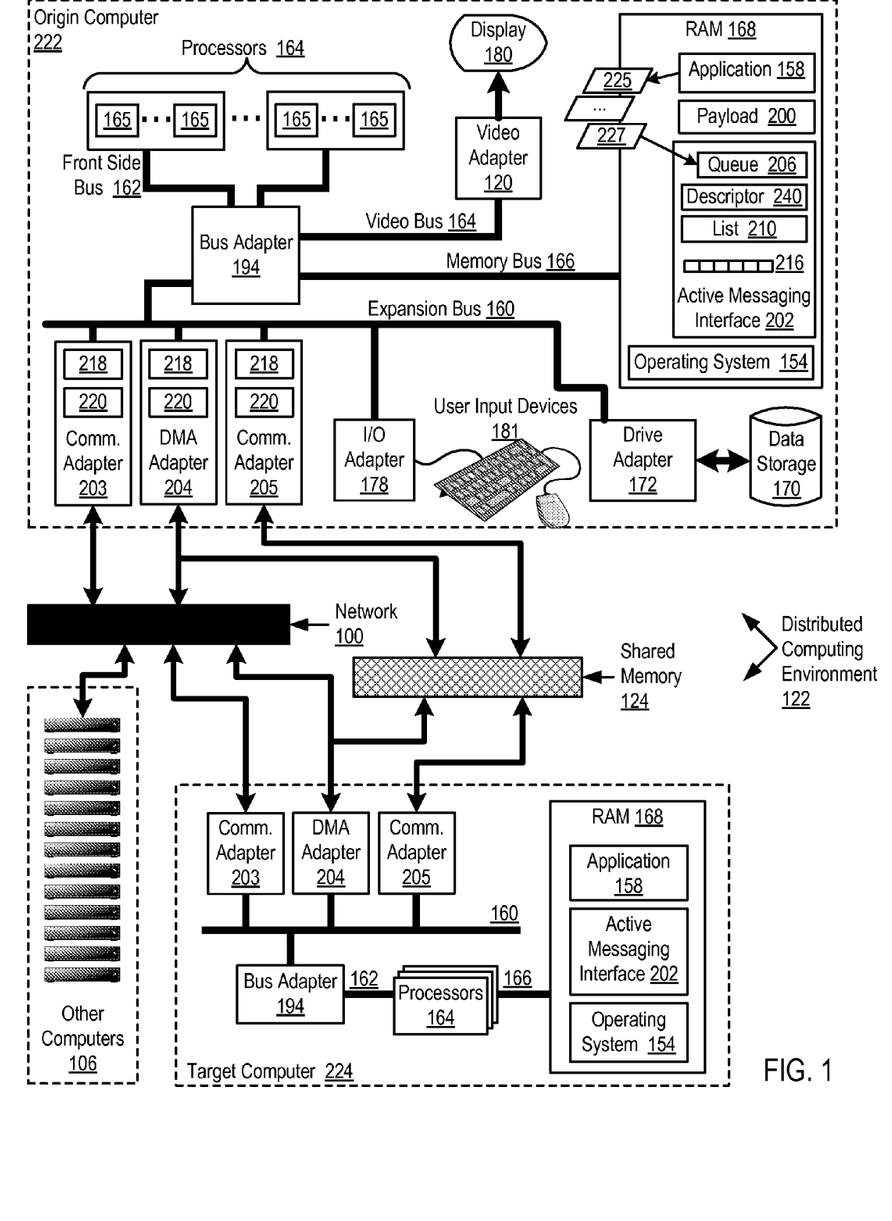
FIG. 1 sets forth a functional block diagram of an example distributed computing environment that implements completion processing for data communications instructions according to embodiments of the present invention.

Example methods, apparatus, and products for completion processing for data communications instructions in a distributed computing environment in accordance with the present invention are described with reference to the accompanying drawings, beginning with FIG. 1. FIG. 1 sets forth a functional block diagram of an example distributed computing environment (122) that implements completion processing for data communications instructions according to embodiments of the present invention. The distributed computing environment (122) of FIG. 1 includes several computers, an origin computer (222), a target computer (224), and other computers (106), all of which are coupled for data communications through communications adapters (203, 204, 205) and an active messaging interface ('AMI') (202). For ease of illustration, only the origin computer (222) and the target computer (224) are illustrated in detail with the communications adapters (203, 204, 205) and the AMI (202), but the other computers (106) also are so equipped.

The origin and target computers (222, 224) of FIG. 1 include one or more computer processors (164) or 'CPUs' as well as random access memory (168) ('RAM'). Each processor (164) can support multiple hardware compute cores (165), and each such core can in turn support multiple threads of execution, hardware threads of execution as well as software threads. Each processor (164) is connected to RAM (168) through a high-speed memory bus (166)—and through a high-speed front side bus (162), a bus adapter (194), and an extension bus (160) to other components of the computer. Stored in RAM (156) is an application program (158), a module of computer program instructions that carries out user-level data processing using linear, SMP, or parallel algorithms that include data communications among the computers in the distributed computing environment, including issuing data communications instructions to the AMI (202).

Also shown stored in RAM (168) is a the AMI (202) itself, a module of automated computing machinery that carries out completion processing for data communications instructions in a distributed computing environment according to embodiments of the present invention. An AMI (202) can be developed from scratch to carries out completion processing for data communications instructions in a distributed computing environment according to embodiments of the present invention, using a traditional programming language such as the C programming language or C++, for example, and using traditional programming methods to write communications routines that send and receive data among computers in the distributed computing environment through data communications networks or shared-memory transfers. Such an AMI developed from scratch can expose to applications an entirely new application programming interface ('API'). As an alternative for an AMI developed from scratch, an AMI (202) can expose a traditional API, such as MPI's API, to the application (158) so that the application can gain the benefits of an AMI with no need to recode the application. As an alternative to development from scratch, however, existing prior art system-level messaging modules may be improved to carry out completion processing for data communications instructions in a distributed computing environment according to embodiments of the present invention, existing modules that already implement a traditional interface. Examples of prior-art system-level messaging modules that can be improved to implement completion processing for data communications instructions in a distributed computing environment according to embodiments of the present invention include such parallel communications libraries as the traditional 'Message Passing Interface' ('MPI') library, the 'Parallel Virtual Machine' ('PVM') library, MPICH, and the like. In the example of FIG. 1, the AMI (202) is represented in RAM (168). Readers will recognize, however, that the representation of the AMI in RAM is a convention for ease of explanation rather than a limitation of the present invention, because the AMI in fact can be implemented partly as software or firmware and hardware—or even, at least in some embodiments, entirely in hardware.

Also stored in RAM (168) is an operating system (154). An operating system is a computer software component that is responsible for execution of applications programs and for administration of access to computer resources, memory, processor time, and I/O functions, on behalf of application programs. Operating systems useful for completion processing for data communications instructions in a distributed computing environment according to embodiments of the present invention include UNIX™, Linux™, Microsoft XP™, AIX™, IBM's i5/OS™ and others as will occur to those of skill in the art. The application (168), the AMI (202), and the operating system (154) in the example of FIG. 1 are shown in RAM (168), but many components of such data processing modules typically are stored in non-volatile memory also, such as, for example, on a disk drive (170).

The origin computer (222) of FIG. 1 includes disk drive adapter (172) coupled through expansion bus (160) and bus adapter (194) to the processor (164) and other components of the computer (222). Disk drive adapter (172) connects non-volatile data storage to the computer (222) in the form of disk drive (170). Disk drive adapters useful in computers for completion processing for data communications instructions in a distributed computing environment according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example origin computer (222) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (222) of FIG. 1 includes a video adapter (120), which is an example of an I/O adapter specially designed for graphic output to a display device (180) such as a display screen or computer monitor. Video adapter (120) is connected to processors (164) through a high speed video bus (193), bus adapter (194), and the front side bus (162), which is also a high speed bus.

The example target and origin computers (222, 224) of FIG. 1 include communications adapters (203, 204, 205) for data communications with other computers through a data communications network (100) or a segment of shared memory (124). Such data communications may be carried out serially through RS-232 connections, through external buses such as a Universal Serial Bus ('USB'), through data communications data communications networks such as Internet Protocol ('IP') data communications networks, and in other ways as will occur to those of skill in the art. Communications adapters implement the hardware level of data communications through which one computer sends data communications to another computer, directly or through a data communications network. Examples of communications adapters useful for completion processing for data communications instructions in a distributed computing environment according to embodiments of the present invention include modems for wired dial-up communications, Ethernet (IEEE 802.3) adapters for wired data communications network communications, and 802.11 adapters for wireless data communications network communications. In the particular example of FIG. 1, communications adapters (157) adapt computers for communications through a network (100). Examples of networks useful for data communications in a distributed computing environment according to embodiments of the present invention include Infiniband™, Gigabit Ethernet™, Fibre Channel™, PCI Express™, Serial ATA™, and others.

The communications adapters in the example of FIG. 1 include direct memory access ('DMA') adapters (204), modules of automated computing machinery that implement, through communications with other DMA adapters on other computers direct memory access to and from memory on its own computer as well as memory on other computers. Direct memory access is a way of reading and writing to and from memory among computers with reduced operational burden on computer processors (164); a CPU initiates a DMA transfer, but the CPU does not execute the DMA transfer. A DMA transfer essentially copies a block of memory from one computer to another, or between RAM segments of applications on the same computer, from an origin to a target for a PUT operation, from a target to an origin for a GET operation, for example.

Also in the example of FIG. 1, communications adapters (205) adapt computers for communications through a segment of shared memory (124). In the example of FIG. 1, each processor or compute core has uniform access to the RAM (168) on the same computer, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory (124) can be configured locally for one endpoint and remotely for another endpoint—or remotely from both endpoints of a communication. From the perspective of an origin computer transmitting data through a segment of shared memory that is configured remotely with respect to the origin endpoint, transmitting data through the segment of shared memory will appear slower that if the segment of shared memory were configured locally with respect to the origin—or if the segment were local to both the origin and the target. The shared memory communications adapter (205) presents a similar interface to the AMI (202) as do the other adapters (203, 204). In embodiments where communications through a shared memory segment is available, however, it will often be faster than other methods.

The origin computer (222) and the target computer (224) are so labeled in this example because the origin computer is described as is executing data communications instructions and therefore originating data transfers and the target computer is described as a subject of data communications instructions. The origin/target distinction does not describe the direction of data flow. A DMA PUT instruction transfers data from the origin computer to the target computer; a DMA GET instruction transfers data in the opposite direction from the target to the origin. In addition, the description here of only one target and one origin is not a limitation. In a collective BROADCAST, a root process on an origin computer can transfer data to a large plurality of target, including all the computers in the distributed computing environment. Similarly, In a collective GATHER, origin processes on all the computers in the distributed computing environment can transfer data to single root process on one origin computer. In client/server, SMP, peer-to-peer, and other architectures, multiple origin computers will send and receive message data among multiple target computers through an AMI.

The origin computer (222) in the example of FIG. 1 functions generally to carry out completion processing for data communications instructions in a distributed computing environment by receiving in the AMI (202) from an application (158) a sequence (225 . . . 227) of data communications instructions. In an embodiment, the application calls a function in an API that is exposed by the AMI to insert or post the instructions into an instruction queue in the AMI. In this way, the application's call to the API function is non-blocking That is, the application is not required to wait around for completion of the processing of the data communications instructions. The application inserts or posts an instruction into the queue, continues with other processing, and is informed of instruction completion by the AMI through a done callback.

Each instruction specifies a transfer of payload data (200) among computers in the distributed computing environment, and at least one of the instructions specifies a callback function. Examples of data communications instructions amendable to, or that can be improved to work with, completion processing according to embodiments of the present invention include the following, as well as others that will occur to those of skill in the art:

rendezvous network-based SEND instructions in which both origin and target endpoints communicate and participate in a data transfer, good for longer messages, typically composed of handshakes transferring header information followed by packet switched messaging or DMA operations to transfer payload data, eager network-based SEND instructions in which only the origin or root computer conducts a data transfer, merely informing the target that the transfer has occurred, and requiring no communications or other participation from the target, rendezvous SEND instructions with operations conducted, not through a network, but through shared memory, in which both the origin and target communicate and participate in a data transfer, eager SEND instructions conducted, not through a network, but through shared memory, in which only the origin or root conducts a data transfer, merely informing targets that the transfer has occurred, but requiring no communications or other participation from the targets, network-based DMA PUT instructions, useful for fast transfers of small messages, sometimes containing header data and payload data in a single transfer or packet—DMA algorithms also can be used as components of other instructions—as for example a SEND instruction that does an origin-target handshake and then conducts payload transfers with PUTs, DMA PUT instructions with transfers through shared memory, again useful for fast transfers of small messages, sometimes containing header data and payload data in a single transfer or packet—DMA instructions also can be used as components of other algorithms—as for example a SEND instruction that does an origin-target handshake through a segment of shared memory and then conducts payload transfers with PUTs, data communications instructions based on DMA GET operations, either networked or through shared memory, and data communications instructions that include eager or rendezvous RECEIVE operations, either with send-side matching of SENDs or with receive-side matching.

The term 'payload' distinguishes header data and the like in data communications. The payload data (200) is specified typically with a buffer memory address and a quantity, for example, at memory address SendBuffer find one kilobyte of payload data; the location and quantity of payload data as well as any callback functions are provided by the application as parameters of the data communications instruction. A 'callback function' is often referred to in this specification simply as a 'callback.' Callback functions include dispatch callbacks as well as done callbacks. A dispatch callback is a function to be called upon receipt of a data communications instruction. A done callback is a function to be called upon completion of the transfer of payload data as specified by a data communications instruction. Except as otherwise stated in context, discussion and description of a callback in this specification is a description of a done callback, so that the term 'callback' and 'done callback' are generally synonyms, unless otherwise stated. The origin computer (222) in the example of FIG. 1 also injects, by the AMI (202) for each data communications instruction (225 . . . 227) into a slot in an injection FIFO buffer (218) of a data communication adapter (203, 204, 205), an injection descriptor (240). The injection descriptor specifies to the communications adapter the transfer of payload data, and the slot in the injection FIFO buffer (218) has a corresponding slot in a pending callback list (210). The term 'injection' connotes the 'injection' of transfer data into a data communications resource, a network, a shared memory, and the like, for actual transport to a target. An injection descriptor provides a description of a data communications instruction that is recognizable or administrable by lower level data communications resources, including communications adapters, DMA adapters, and the like. The origin computer (222) also lists, through the AMI (202) in the corresponding slot in the pending callback list (210) for each data communications instruction, any callback function specified by that instruction and increments a pending callback counter (216) for each listed callback function.

The communications adapter (here, one of 203, 204, 205) that received the injection descriptor transfers payload data in accordance with each injection descriptor in its injection FIFO buffer (218) and increments a transfer counter (220) upon completion of each transfer. The origin computer (222) through its AMI also determines from counter values (216, 220) whether the pending callback list (210) presently includes callback functions for which transfers of payload data have been completed and calls through its AMI any callback functions in the pending callback list (210) for which transfers of payload data have been completed, decrementing the pending callback counter (216) for each callback function called.

The arrangement of computers, communications adapters, and other devices making up the example distributed computing environment illustrated in FIG. 1 are for explanation, not for limitation. Data processing systems useful for completion processing for data communications instructions in a distributed computing environment according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
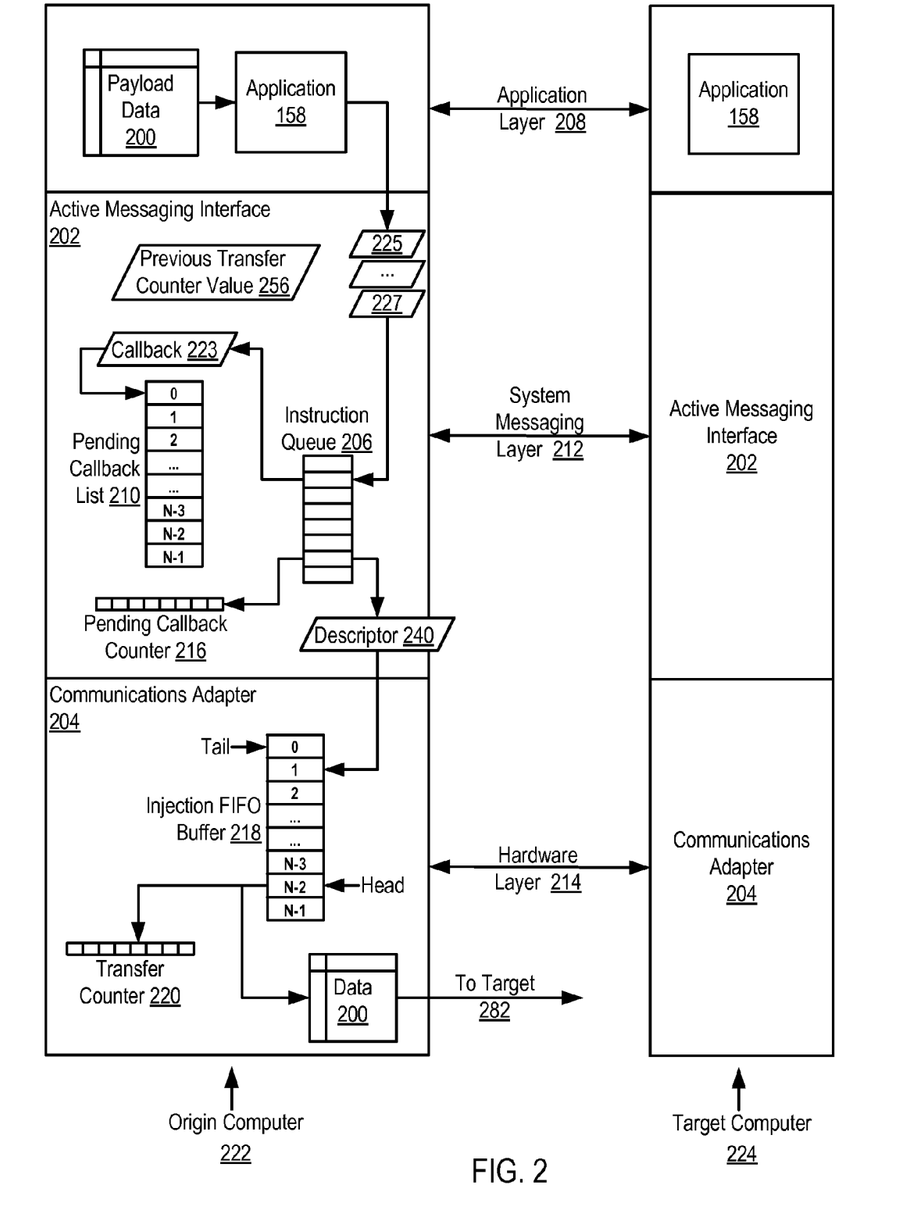
FIG. 2 sets forth a block diagram of an example protocol stack useful in apparatus that implements completion processing for data communications instructions in a distributed computing environment according to embodiments of the present invention.

For further explanation, FIG. 2 sets forth a block diagram of an example protocol stack useful in apparatus that implements completion processing for data communications instructions in a distributed computing environment according to embodiments of the present invention. The example protocol stack of FIG. 2 includes a hardware layer (214), a system messaging layer (212), and an application layer (208). For ease of explanation, the protocol layers in the example stack of FIG. 2 are shown connecting an origin computer (222) and a target computer (224), although it is worthwhile to point out that in embodiments, the origin computer and the target computer can be the same computer, because any particular transfer can be from an origin application on a computer to a target application on the same computer. This pattern would be very common, for example, in a supercomputer whose compute nodes operate multi-threaded. Every thread of execution on such a computer can function as both an origin or a target for data transfers through an AMI, and both the origin and its target can be located on the same computer. So an origin computer (222) and its target computer (224) can in fact, and often will, be the same computer.

The application layer (208) provides communications among applications (158) running on the computers (222, 224) by invoking functions in an Active Messaging Interface ('AMI') (202) installed on each computer. Applications may communicate messages invoking functions of an application programming interface ('API') exposed by the AMI (202). The AMI can expose a novel, custom API, or the AMI can expose a traditional API, such as, for example, an API of an MPI library, to applications (158) so that the application can gain the benefits of an AMI, reduced network traffic, callback functions, and so on, with no need to recode the application.

The example protocol stack of FIG. 2 includes a system messaging layer (212) implemented here as an Active Messaging Interface or 'AMI' (202). The AMI provides system-level data communications functions that support messaging in the application layer (208) and the system messaging layer (212). Such system-level functions are typically invoked through an API exposed to the application (158) in the application layer (208).

The protocol stack of FIG. 2 includes a hardware layer (214) that defines the physical implementation and the electrical implementation of aspects of the hardware on the computers such as the bus, network cabling, connector types, physical data rates, data transmission encoding and many other factors for communications between the computers (222, 224) on the physical network medium. In parallel computers that implement completion processing for data communications instructions in a distributed computing environment according to embodiments of the present invention, the hardware layer includes communications adapters, including DMA adapters, and network links, including routers, packet switches, and the like. In this particular example, the hardware layer (214) in each computer includes a communication adapter (204).

The origin computer (222) in the example of FIG. 2 functions generally to carry out completion processing for data communications instructions in a distributed computing environment by receiving in the AMI (202) from an application (158) a sequence (225 . . . 227) of data communications instructions. In an embodiment, the application (158) calls a function in an API that is exposed by the AMI to insert or post the instructions into an instruction queue (206) in the AMI. In this way, the application's call to the API function is non-blocking The application (158) does not block or spin on the post to the instruction queue. Instead, the application inserts or posts an instruction into the queue (206), continues with other processing, and is eventually informed of instruction completion by the AMI through a done callback. Each instruction (225 . . . 227) specifies a transfer of payload data (200) among computers in a distributed computing environment, and at least one of the data communications instructions specifies a callback function (223).

The origin computer (222) in the example of FIG. 2 also injects, by the AMI (202) for each data communications instruction (225 . . . 227) into a slot in an injection FIFO buffer (218) of a data communication adapter (203, 204, 205), an injection descriptor (240). 'FIFO' is an abbreviation of 'first-in-first-out' and connotes the fact that the communications adapter (204) processes its injection descriptors in the order in which they are placed in the injection FIFO buffer (218). The injection descriptor (240) specifies to the communications adapter (204) the transfer of payload data, and the slot in the injection FIFO buffer (218) has a corresponding slot in a pending callback list (210). Both the injection FIFO buffer (218) and the pending callback list (210) are apportioned into N slots, here labeled 0 . . . N−1. The slots 'correspond' in that:

any pending callback for the injection descriptor in slot 0 of the injection FIFO buffer (218) is found in slot 0 of the pending callback list (210)

any pending callback for the injection descriptor in slot 1 of the injection FIFO buffer (218) is found in slot 1 of the pending callback list (210)

. . .

any pending callback for the injection descriptor in slot N−2 of the injection FIFO buffer (218) is found in slot N−2 of the pending callback list (210), and any pending callback for the injection descriptor in slot N−1 of the injection FIFO buffer (218) is found in slot N−1 of the pending callback list (210).

The AMI (202) of the origin computer (222) lists, in the corresponding slot in the pending callback list (210) for each data communications instruction, any callback function specified by that instruction and increments a pending callback counter (216) for each listed callback function. The term 'pending' as used here indicates that a callback has been listed but it corresponding data transfer has not yet been completed. Each done callback is called only after completion of its corresponding data transfer, the transfer represented by an injection descriptor in a corresponding slot in the injection FIFO buffer. The AMI (202) increments the pending callback counter (216) every time the AMI lists a callback (223) in the pending callback list (210) and decrements the pending callback counter (216) every time it calls a callback function from the list (210). A zero value of the pending callback counter (216) therefore indicates that there are no callback functions presently listed in the pending callback list (210). When it calls a callback the AMI nulls the slot in the pending callback list where that callback was listed. A null value in a slot in the pending callback list means either that no callback was listed for a data communications instruction for which a descriptor was injected into the injection FIFO buffer because that instruction specified no callback—or that the callback listed in that slot has already been called.

The communications adapter (204) transfers payload data (200) in accordance with each injection descriptor (240) in its injection FIFO buffer (218) and increments a transfer counter (220) upon completion of each transfer. The AMI of the origin computer (222) also determines from counter values (216, 220, 256) whether the pending callback list (210) presently includes callback functions for which transfers of payload data have been completed and calls through its AMI any callback functions in the pending callback list (210) for which transfers of payload data have been completed, decrementing the pending callback counter (216) for each callback function called. The AMI (202) functions iteratively against the data communications in its instruction queue (206). In each iteration, the AMI processes an instruction from the queue (206) by injecting a descriptor into a slot in the injection FIFO buffer (218) and, if a callback is specified, listing a callback in a corresponding slot in the pending callback list (210). Also in each iteration, the AMI determines whether there are any listed callbacks whose corresponding data transfer have been completed—by checking the pending callback counter, where a non-zero value indicates that there are pending callbacks—and, if there are pending callbacks, determining whether their transfer are completed by comparing the present value of the transfer counter (220) to a previous value (256) of the transfer counter. The fact that the pending callback counter value is non-zero is not enough to determine whether transfers have completed for listed callbacks, so the AMI also consults the transfer counter. Each iteration of control logic of the AMI stores the present value of the transfer counter during that iteration. Then in each next iteration, the AMI has access both to the current value of the transfer counter (220) as well as the previous value (256), the value of the transfer counter during the previous iteration. If the values are the same, then the data transfers for the listed callbacks have not been completed, and the AMI must wait for a next iteration before calling the listed callbacks. If the current value of the transfer counter is greater than the previous value, then the communication adapter has incremented the transfer counter since the previous iteration of the AMI, and there are one or more listed callbacks whose data transfers are now complete. The AMI calls those callbacks, decrementing the pending callback counter as it does so.

Figure 3:
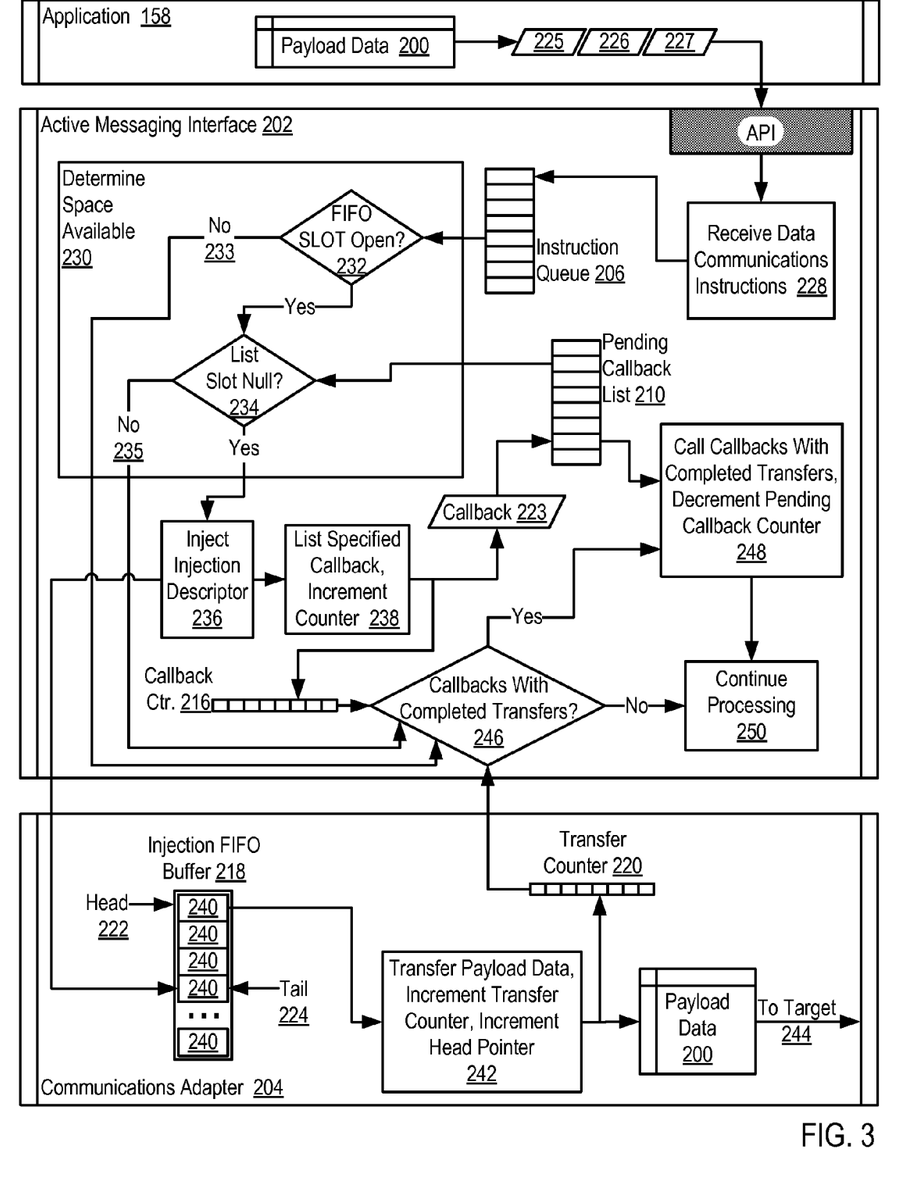
FIG. 3 sets forth a flow chart illustrating an example method of completion processing for data communications instructions in a distributed computing environment according to embodiments of the present invention.

For further explanation, FIG. 3 sets forth a flow chart illustrating an example method of completion processing for data communications instructions in a distributed computing environment according to embodiments of the present invention. The method of FIG. 3 is implemented in a distributed computing environment like that described above with reference to FIG. 1, a distributed computing environment that includes a plurality of computers coupled for data communications through communications adapters and through an active messaging interface ('AMI'). The AMI (202) is a module of automated computing machinery that operates iteratively to process data communications instructions (225 . . . 227) disposed in a queue (206) of data communications instructions.

The method of FIG. 3 includes receiving (228), in the AMI from an application executing on a computer in the distributed computing environment, a sequence of data communications instructions (225 . . . 227). Each such instruction specifies a transfer of payload data (200) among computers in the distributed computing environment, where one or more of the instructions specifies a callback function (223). In the example of FIG. 3, the application (158) calls a function in an API that is exposed by the AMI to insert or post the instructions into an instruction queue (206) in the AMI. In this way, the application's call to the API function is non-blocking That is, the application is not required to wait around for completion of the processing of the data communications instructions. The application inserts or posts an instruction into the queue, continues with other processing, and is informed of instruction completion by the AMI through a done callback.

The method of FIG. 3 also includes determining (230) by the AMI (202) for each data communications instruction (225 . . . 227) that space is available in an injection FIFO buffer (218) of the communications adapter (204) for that instruction's injection descriptor (240). Determining (230) that space is available in the injection FIFO buffer (218), in the example of FIG. 3, is carried out by first determining (232) that a slot is open in the injection FIFO buffer. The communication adapter (204) maintains buffer pointers: a head pointer (222) that points to the 'head' of the injection FIFO buffer, that is, the slot containing the injection descriptor currently being processed by the communication adapter, and a tail pointer (224) that points to the next slot available for injection of a descriptor. Comparing the values of these two pointers (222, 224) yields the number of available slots in the injection FIFO buffer. If the value of the tail point is equal to the value of the head point, the tail has caught up to the head, the number of available slots is 0, and processing in the AMI must pause until the communications adapter complete processing of the slot currently indicated by the head pointer, incrementing the head pointer, making that slot available for use. The communications adapter can maintain the number of available slots, so that the AMI can query the adapter for that information, or the AMI can examine the pointers (222, 224) directly and make the comparison itself. If the pointers (222, 224) indicate that no FIFO slot is open for an injection descriptor, the AMI continues processing (233) without injecting (236) a descriptor and without listing (238) any callback, instead proceeding directly to determining (246) whether there are listed pending callbacks with completed transfers, calling (248) any listed pending callbacks with completed transfers, loop around in the iteration to determining (230) whether space is available in the injection FIFO buffer (218), inject (236) a descriptor, list (238) any specified callback and increment the pending callback counter (216), and so on.

The fact that a slot is open in the injection FIFO buffer, however, does not necessarily mean that that slot is available for an injection descriptor. In the course of processing operations, the communication adapter completes a data transfer according to a descriptor, increments the head pointer to point to the next slot, increments the transfer counter, and moves on to work on the next descriptor, all without knowing whether any corresponding callback has been called. If the corresponding callback has not been called, then it is premature for the AMI yet to use the recently vacated slot in the injection FIFO buffer. In the example of FIG. 3, therefore, determining (230) that space is available in the injection FIFO buffer (218) also includes determining (234) that a corresponding slot contains a null value in the pending callback list. The corresponding slot in the pending callback list is a slot in the pending callback list that corresponds to a slot in the injection FIFO buffer to which the tail pointer (224) currently points. If the tail pointer (224) currently points to slot 0 in the injection FIFO buffer, then the corresponding slot to check is slot 0 in the pending callback list. If the tail pointer (224) currently points to slot 1 in the injection FIFO buffer, then the corresponding slot to check is slot 1 in the pending callback list. And so on. A null value in the corresponding slot of the pending callback list indicates that the corresponding slot in the injection FIFO buffer is actually available for injection, because either the corresponding callback has already been called—or possibly the corresponding data communications instruction specified no callback so no callback was ever listed in that slot. Either way, if the pointer (222, 224) indicate an open slot in the injection FIFO buffer and the corresponding slot in the pending callback list is null, then the open slot in the injection FIFO buffer is actually available for an injection of an injection descriptor from the AMI. If the corresponding slot in the pending callback list is non-null, it contains a listed callback that has not yet been called, and the AMI again continues processing (235) without injecting (236) a descriptor and without listing (238) any callback, instead proceeding directly to determining (246) whether there are listed pending callbacks with completed transfers, calling (248) any listed pending callbacks with completed transfers, loop around in the iteration to determining (230) whether space is available in the injection FIFO buffer (218), inject (236) a descriptor, list (238) any specified callback and increment the pending callback counter (216), and so on.

The method of FIG. 3 also includes injecting (236), by the AMI for each data communications instruction (225 ... 227) into a slot in the injection FIFO buffer (218) of the data communication adapter (204), an injection descriptor (240) specifying to the communications adapter the transfer of payload data (200). As mentioned, each slot in the injection FIFO buffer (218) has a corresponding slot in the pending callback list (210) where a corresponding callback function can be listed. In addition, in injecting (236) an injection descriptor, the AMI also typically increments the tail pointer (224) of the injection FIFO buffer (218) to point to a next slot in the injection FIFO buffer. This description is to a 'next slot' only, not to a 'next open slot.' The AMI need not test at this time whether the next slot is actually open; the AMI just increments the pointer (224) to the next slot. If it turn out later that that next slot is not open, that fact will be determined (230, 232, 234) on a next iteration through the functions of the AMI.

The method of FIG. 3 also includes listing (238), by the AMI in the corresponding slot in the pending callback list for each data communications instruction, any callback function specified by that instruction, incrementing a pending callback counter for each listed callback function. Many, most, or all of the data communication will specify a callback, although it is possible that some of them will not. When the AMI calls a callback, the AMI nulls the slot in the pending callback list where that callback was listed. For a data communications instruction that does not specify a callback function, the slot in the pending callback list corresponding to the slot in the injection FIFO buffer where a descriptor is injected for that instruction is left null.

The method of FIG. 3 also includes transferring (242) payload data by the communications adapter in accordance with each injection descriptor (240) in the injection FIFO buffer (218), including incrementing a transfer counter (220) upon completion of each transfer. In an embodiment, the size of the transfer counter is such that it need never be decremented or cleared. Also in embodiments, transferring (242) payload data includes incrementing, upon completion of each transfer, the head pointer (222) of the injection FIFO buffer to point to a next injection descriptor (240) to be processed by the communications adapter (204).

The method of FIG. 3 also includes determining (246) from counter values whether the pending callback list presently includes callback functions for which transfers of payload data have been completed and calling by the AMI any callback functions in the pending callback list for which transfers of payload data have been completed, decrementing the pending callback counter for each callback function called. If there are pending callbacks with completed transfers, the AMI calls (248) them and decrements the pending callback counter (216). If there are no listed callbacks with completed transfers, the AMI continues processing (250), goes on to its next iteration with a next instruction from the instruction queue (206), without calling any callbacks, leaving the pending callback counter unchanged. Determining (246) from counter values whether there are any listed callback with completed data transfers is explained in more detail below with reference to FIG. 4.

Figure 4:
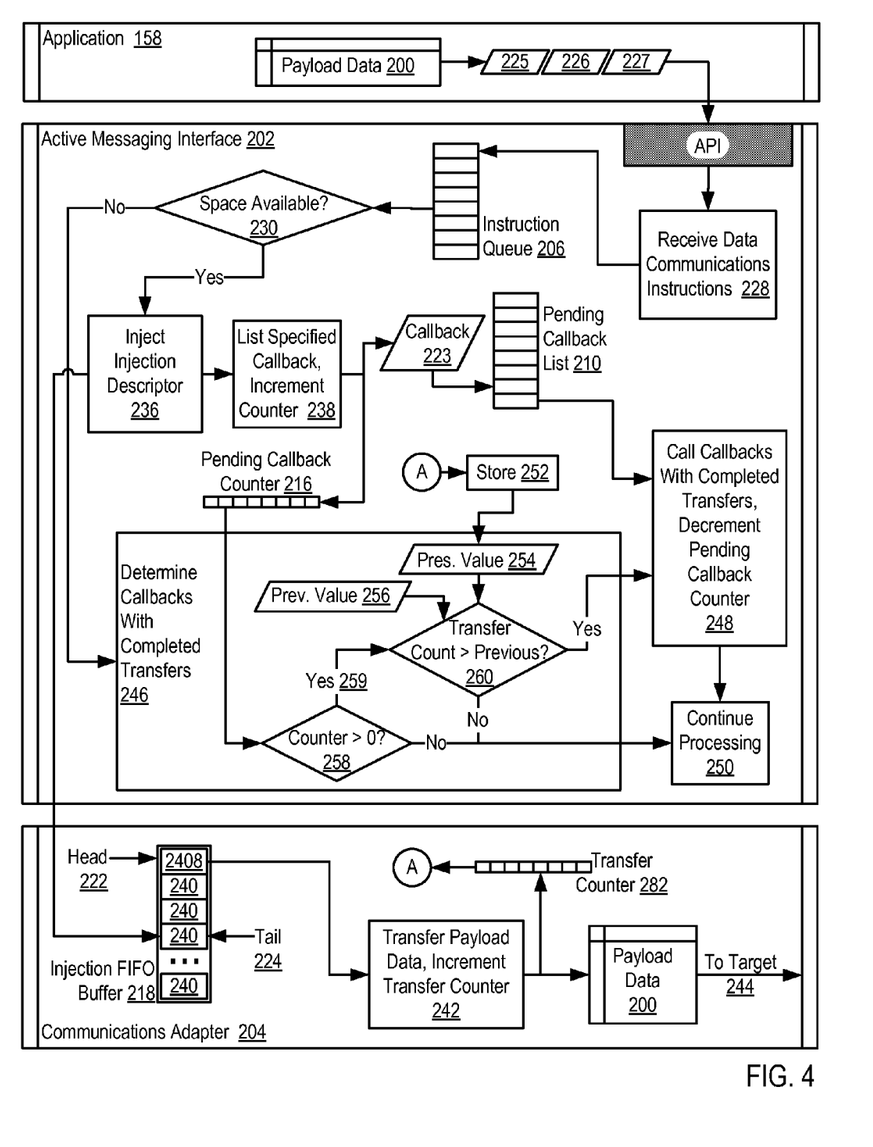
FIG. 4 sets forth a flow chart illustrating a further example method of completion processing for data communications instructions in a distributed computing environment according to embodiments of the present invention.

For further explanation, FIG. 4 sets forth a flow chart illustrating a further example method of completion processing for data communications instructions in a distributed computing environment according to embodiments of the present invention. The method of FIG. 4 is similar to the method of FIG. 3 in that it also is implemented in a distributed computing environment like that described above with reference to FIG. 1, a distributed computing environment that includes a plurality of computers coupled for data communications through communications adapters and through an active messaging interface ('AMI'). The AMI (202) is a module of automated computing machinery that operates iteratively to process data communications instructions (225 ... 227) disposed in a queue (206) of data communications instructions. The method of FIG. 4 is also like the method of FIG. 3 in that it includes receiving (228) a sequence of data communications instructions (225 ... 227); determining (230) that space is available in an injection FIFO buffer (218) of the communications adapter (204) for an instruction's injection descriptor (240); injecting (236) an injection descriptor (240) specifying the transfer of payload data (200); listing (238) any callback function (223) specified by an instruction, incrementing a pending callback counter (216) for each listed callback function; transferring (242) payload data through the communications adapter, incrementing a transfer counter (220) upon completion of each transfer; determining (246) from counter values whether the pending callback list presently includes callback functions with completed transfers; and calling any callback functions in the pending callback list for which transfers of payload data have been completed, decrementing the pending callback counter for each callback function called.

The illustration of the method of FIG. 4, however, contains more detail than did the method of FIG. 3 regarding the determination whether there are any listed callbacks with completed data transfers. The example method of FIG. 4, however, includes storing (252) the present value (254) of the of the transfer counter (282) immediately before determining (246) whether the pending callback list (210) presently includes callback functions for which transfers of payload data have been completed. The transfer counter (282) is incremented by the communications adapter (204) in a manner that is completely asynchronous with respect to the functions of the AMI. The AMI uses values from the transfer counter, but the AMI has no control over the operation of the transfer counter. The AMI will use transfer counter values to determine whether the pending callback list presently include callback function for which transfers of payload data have been complete, but the value of the transfer counter can change during the process of making that determination. So the method here is to store the present value of the transfer counter before beginning the determination (246), in effect, grabbing a snapshot of the transfer counter for use in determining whether the pending callback list (210) presently includes callback functions for which transfers of payload data have been completed, using that value even if the actual counter value changes in the meantime.

In the method of FIG. 4, determining (246) from counter values whether the pending callback list presently includes callback functions for which transfers of payload data have been completed includes determining (258) whether the present value of the pending callback counter (216) is greater than zero. If there are no listed pending callbacks, then there is no need to call them (248), and processing continues (250) with another iteration through the functions of the AMI, get a next data communications instruction from the queue (206), determine (230) that space is available in the injection FIFO buffer (218), inject (236) a descriptor, list (238) any specified callback and increment the pending callback counter (216), determine (246) whether there are listed pending callback with completed transfers, call (248) any listed pending callbacks with completed transfers, and so on.

The fact that there are pending callbacks, however, does not mean that their corresponding data transfers have been completed. In the method of FIG. 4, therefore, determining (246) from counter values whether the pending callback list presently includes callback functions for which transfers of payload data have been completed also includes determining (260) whether the stored value (254) of the transfer counter is greater than a previously-stored value (256) of the transfer counter (282). The AMI retains the stored value (256) of the transfer counter from the previous iteration through the functions of the AMI and compares the previously stored value (256) with the stored present value (254) of the transfer counter. If the values are the same, then there has been no change in the status of the listed callback since the last iteration and the corresponding data transfers for the listed pending callbacks have not been completed. In that case, there is no need to call (248) the listed pending callbacks, and processing continues (250) with another iteration through the functions of the AMI. If the present value (254) of the transfer counter (282) is greater than the previously stored value (256), then the communication adapter (204) has completed the corresponding data transfers since the last iteration through the functions of the AMI, and the AMI can proceed to call (248) the callbacks listed in the pending callback list and decrement the pending callback counter (216) for each such call—before continuing processing with yet another iteration through the functions of the AMI. In the method of FIG. 4, determining (246) that the pending callback list (210) presently includes callback functions for which transfers of payload data have been completed is implemented with no requirement for message sequence numbers and with no requirement for any use of completion descriptors in the injection FIFO buffer.

Example embodiments of the present invention are described largely in the context of a fully functional computer system for completion processing for data communications instructions in a distributed computing environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

Example embodiments of the present invention are described largely in the context of fully functional computers that implements completion processing for data communications instructions in a distributed computing environment according to embodiments of the present invention. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of completion processing for data communications instructions in a distributed computing environment, the distributed computing environment including a plurality of computers coupled for data communications through communications adapters and an active messaging interface ('AMI'), the method comprising:

receiving, in the AMI from an application executing on a computer in the distributed computing environment, a sequence of data communications instructions, each instruction specifying a transfer of payload data among computers in the distributed computing environment, at least one of the instructions specifying a callback function;

injecting, by the AMI for each data communications instruction into a slot in an injection FIFO buffer of a data communication adapter, an injection descriptor specifying to the communications adapter the transfer of payload data, the slot in the injection FIFO buffer having a corresponding slot in a pending callback list;

listing, by the AMI in the corresponding slot in the pending callback list for each data communications instruction, any callback function specified by that instruction, incrementing a pending callback counter for each listed callback function;

transferring payload data by the communications adapter in accordance with each injection descriptor in the injection FIFO buffer, incrementing a transfer counter upon completion of each transfer;

determining from counter values whether the pending callback list presently includes callback functions for which transfers of payload data have been completed; and calling by the AMI any callback functions in the pending callback list for which transfers of payload data have been completed, decrementing the pending callback counter for each callback function called.

2. The method of claim 1 wherein receiving a sequence of data communications instructions further comprises receiving the sequence of data communications instructions through non-blocking calls from the application to the AMI.

3. The method of claim 1 wherein injecting an injection descriptor further comprises incrementing a tail pointer of the injection FIFO buffer to point to an open slot in the injection FIFO buffer.

4. The method of claim 1 wherein transferring payload data further comprises incrementing, upon completion of each transfer, a head pointer of the injection FIFO buffer to point to a next injection descriptor to be processed by the communications adapter.

5. The method of claim 1 further comprising determining by the AMI for each data communications instruction that space is available in the injection FIFO buffer of the communications adapter for that instruction's injection descriptor, including determining that a slot is open in the injection FIFO buffer and that a corresponding slot contains a null value in the pending callback list.

6. The method of claim 1 wherein:
the method further comprises storing the present value of the of the transfer counter immediately before determining whether the pending callback list presently includes callback functions for which transfers of payload data have been completed; and determining from counter values whether the pending callback list presently includes callback functions for which transfers of payload data have been completed, further comprises determining whether the present value of the pending callback counter is greater than zero and determining whether the stored value of the transfer counter is greater than a previously-stored value of the transfer counter.

7. The method of claim 1 wherein determining that the pending callback list presently includes callback functions for which transfers of payload data have been completed is implemented without message sequence numbers.

8. The method of claim 1 wherein determining that the pending callback list presently includes callback functions for which transfers of payload data have been completed is implemented without completion descriptors.

* * * * *